US011260951B2

(12) United States Patent
Joseph et al.

(10) Patent No.: US 11,260,951 B2
(45) Date of Patent: Mar. 1, 2022

(54) PIVOT FITTINGS BACK UP BEAM ARCHITECTURE

(71) Applicant: The Boeing Company, Chicago, IL (US)

(72) Inventors: Joel Kevin Joseph, Mill Creek, WA (US); Max T. Breedlove, Seal Beach, CA (US); Bernhard Dopker, Bellevue, WA (US); Paul B. Diep, Bothell, WA (US); Steven Edward Pearson, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 180 days.

(21) Appl. No.: 16/820,147

(22) Filed: Mar. 16, 2020

(65) Prior Publication Data

US 2021/0284318 A1 Sep. 16, 2021

(51) Int. Cl.
| | |
|---|---|
| *B64C 1/06* | (2006.01) |
| *B64F 5/10* | (2017.01) |
| *B64C 5/02* | (2006.01) |
| *B64C 1/00* | (2006.01) |
| *B64C 1/10* | (2006.01) |

(52) U.S. Cl.
CPC .............. *B64C 1/064* (2013.01); *B64C 1/069* (2013.01); *B64F 5/10* (2017.01); *B64C 1/10* (2013.01); *B64C 5/02* (2013.01); *B64C 2001/0072* (2013.01); *B64C 2001/0081* (2013.01)

(58) Field of Classification Search
CPC ........... B64C 1/096; B64C 1/064; B64C 1/10; B64C 5/02; B64C 2001/0072; B64C 2001/0081; B64C 1/26; B64C 1/0685; B64C 5/06; B64C 9/02; B64F 5/10
See application file for complete search history.

(56) References Cited

U.S. PATENT DOCUMENTS

| | | | |
|---|---|---|---|
| 2020/0122816 A1* | 4/2020 | Joseph | ...................... B64C 1/26 |
| 2021/0300519 A1* | 9/2021 | Joseph | .................... B64C 1/064 |

* cited by examiner

*Primary Examiner* — Joshua J Michener
*Assistant Examiner* — Ryan Andrew Yankey
(74) *Attorney, Agent, or Firm* — Parsons Behle & Latimer

(57) ABSTRACT

A vehicle, such as an aircraft, structural architecture for supporting a horizontal stabilizer with a back up beam having an upper longeron fitting connected to the front side and secured with a back up fitting on the back side, a lower longeron fitting connected to the front side and secured with a back up fitting on the back side, and a pivot fitting connected to the front side of the first back up beam in between the upper longeron fitting and the lower longeron fitting and secured with a third back up fitting on the back side of the back up beam.

20 Claims, 5 Drawing Sheets

PIVOT FITTINGS BACK UP BEAM ARCHITECTURE

FIELD OF THE DISCLOSURE

This disclosure relates generally to structural architecture for an aircraft. More particularly, this disclosure relates to systems and processes for supporting and reacting loads from an aircraft horizontal stabilizer.

BACKGROUND

Traditional structural architecture designs for aircraft horizontal stabilizers support structure typically consist of metallic back up fittings that are attached to intercostal beams in the tail section (e.g., an aft unpressurized fuselage section) that then attach to the aircraft skin to support the horizontal stabilizer's pivot fitting loads. Separately, metallic bathtub fittings are typically required to connect the skin and longerons in order to transfer load into forward sections of the fuselage (e.g., a forward unpressurized fuselage section). As will be apparent to those of ordinary skill in the art having the benefit of this disclosure, the above-described load path is relatively convoluted and inefficient.

Additionally, typical traditional structural architecture designs, such as those described above, leave limited space available between longeron fitting ribs, require a relatively large force to torque tension bolts and, correspondingly, need awkward, heavy, tools to torque the tension bolts, and have other space constraints between longeron fittings and pivot back up fittings. Other disadvantages, inefficiencies, and drawbacks with existing systems and processes also exist.

SUMMARY

Accordingly, disclosed exemplary embodiments address the above and other disadvantages, inefficiencies, and drawbacks with existing systems and processes.

Disclosed embodiments of the structural architecture include exemplary embodiments with four carbon fiber reinforced polymer (CFRP) C-Channel beams and sixteen titanium back up fittings (e.g., 4 per C-Channel beam) or two metallic I-beams that serve as the support structure for fuselage pivot fittings and longeron fittings which enables all of the horizontal stabilizer loads to remain in a forward unpressurized fuselage section.

Other disclosed embodiments include a vehicle structural architecture including a first back up beam having a front side, a back side, an upper section, and a lower section. The structural architecture also including an upper longeron fitting connected to the front side of the upper section of the first back up beam and secured with a first back up fitting on the back side of the upper section of the first back up beam, a lower longeron fitting connected to the front side of the lower section of the first back up beam and secured with a second back up fitting on the back side of the lower section of the first back up beam, and a pivot fitting connected to the front side of the first back up beam in between the upper longeron fitting and the lower longeron fitting and secured with a third back up fitting on the back side of the first back up beam.

Further disclosed embodiments of the vehicle structural architecture may include a second back up beam having a front side, a back side, an upper section, and a lower section, that is positioned substantially adjacent to the first back up beam. The upper longeron fitting may be connected to the front side of the upper section of the second back up beam and secured with a fourth back up fitting on the back side of the upper section of the second back up beam. The lower longeron fitting may be connected to the front side of the lower section of the second back up beam and secured with a fifth back up fitting on the back side of the lower section of the second back up beam. The pivot fitting may be connected to the front side of the second back up beam in between the upper longeron fitting and the lower longeron fitting and secured with a sixth back up fitting on the back side of the second back up beam.

In further disclosed embodiments, the pivot fitting may have an upper end and a lower end and the third back up fitting and the sixth back up fitting secure the upper end of the pivot fitting. In still further disclosed embodiments, the vehicle structural architecture may include a seventh back up fitting on the back side of the lower section of the first back up beam that secures the lower end of the pivot fitting and an eighth back up fitting on the back side of the lower section of the second back up beam that secures the lower end of the pivot fitting.

In some disclosed embodiments the first back up beam may be a CFRP beam and the second back up beam may be a CFRP beam. In some disclosed embodiments, the first back up fitting, the second back up fitting, and the third back up fitting may be titanium fittings. In some embodiments, the vehicle may be an aircraft.

Also disclosed are methods for assembling a vehicle structural architecture. Disclosed embodiments of the method include connecting an upper longeron fitting to a front side of an upper section of a first back up beam and securing the upper longeron fitting with a first back up fitting on a back side of the upper section of the first back up beam. The method also includes connecting a lower longeron fitting to the front side of a lower section of the first back up beam and securing the lower longeron fitting with a second back up fitting on the back side of the lower section of the first back up beam, and connecting a pivot fitting to the front side of the first back up beam in between the upper longeron fitting and the lower longeron fitting and securing the pivot fitting with a third back up fitting on the back side of the first back up beam.

Disclosed methods also include positioning a second back up beam having a front side, a back side, an upper section, and a lower section substantially adjacent to the first back up beam, connecting the upper longeron fitting to the front side of the upper section of the second back up beam and securing the upper longeron fitting with a fourth back up fitting on the back side of the upper section of the second back up beam, connecting the lower longeron fitting to the front side of the lower section of the second back up beam and securing the lower longeron fitting with a fifth back up fitting on the back side of the lower section of the second back up beam, and connecting the pivot fitting to the front side of the second back up beam in between the upper longeron fitting and the lower longeron fitting and securing the pivot fitting with a sixth back up fitting on the back side of the second back up beam.

In some embodiments, the pivot fitting may have an upper end and a lower end and the method includes securing the upper end of the pivot fitting with the third back up fitting and the sixth back up fitting. In some embodiments, the method may include securing the lower end of the pivot fitting with a seventh back up fitting on the back side of the lower section of the first back up beam, and securing the lower end of the pivot fitting with an eighth back up fitting on the back side of the lower section of the second back up beam.

Also disclosed is an aircraft having a horizontal stabilizer, a fuselage tail section located aft of the horizontal stabilizer, a fuselage section located forward of the horizontal stabilizer, a bulkhead inside the fuselage tail section, the bulkhead having an aft facing side and a forward facing side, a first back up beam having an upper section and a lower section, the first back up beam being mounted on the aft facing side of the bulkhead, a second back up beam having an upper section and a lower section, the second back up beam being mounted on the aft facing side of the bulkhead and spaced apart from the first back up beam, a first upper longeron fitting connected to the forward facing side of the bulkhead and secured to the upper section of the first back up beam with a first back up fitting on the upper section of the first back up beam, a first lower longeron fitting connected to the forward facing side of the bulkhead and secured to the lower section of the first back up beam with a second back up fitting on the lower section of the first back up beam, and a first horizontal stabilizer pivot fitting connected to the forward facing side of the bulkhead in between the first upper longeron fitting and the first lower longeron fitting and secured to the first back up beam with a third back up fitting on the aft facing side of the bulkhead, a second upper longeron fitting connected to the forward facing side of the bulkhead and secured to the upper section of the second back up beam with a fourth back up fitting on the upper section of the second back up beam, a second lower longeron fitting connected to the forward facing side of the bulkhead and secured to the lower section of the second back up beam with a fifth back up fitting on the lower section of the second back up beam, and a second horizontal stabilizer pivot fitting connected to the forward facing side of the bulkhead in between the second upper longeron fitting and the second lower longeron fitting and secured to the second back up beam with a sixth back up fitting on the aft facing side of the bulkhead.

Other embodiments also exist.

Figure 1:
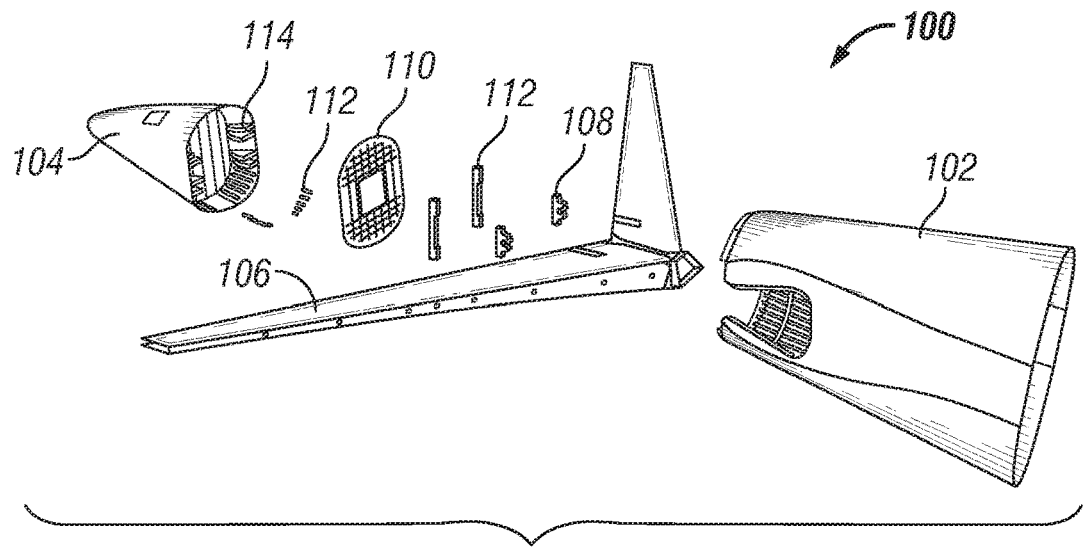
FIG. 1 is an exploded view of a prior art rear section of an aircraft showing unpressurized fuselage sections, forward and aft.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is an exploded view of a prior art aft body fuselage section 100 of an aircraft showing forward unpressurized fuselage section 102 and aft unpressurized fuselage section 104. FIG. 1 represents a typical aft body fuselage section 100 for a typical commercial aircraft except the vertical tail fin is omitted for simplicity. Further, while disclosed embodiments are made in reference to commercial aircraft, the claims are not so limited and other embodiments, such as military aircraft, spacecraft, unmanned aircraft, and the like may incorporate the disclosed systems and methods. As shown, a horizontal stabilizer 106 is typically mounted in aft body fuselage section 100 in between forward section 102 and aft section 104. As also shown, horizontal stabilizer 106 is typically mounted with pivot fittings 108 that are mounted to a bulkhead 110 in between forward section 102 and aft section 104. Other fittings, such as T-chord fittings 112, or the like, may be used to attach the pivot fittings 108 and bulkhead 110. A number of end fittings 112 and backup structures 114 may also be used to secure longeron ends and the pivot fittings 108 as illustrated in FIG. 2.

Figure 2:
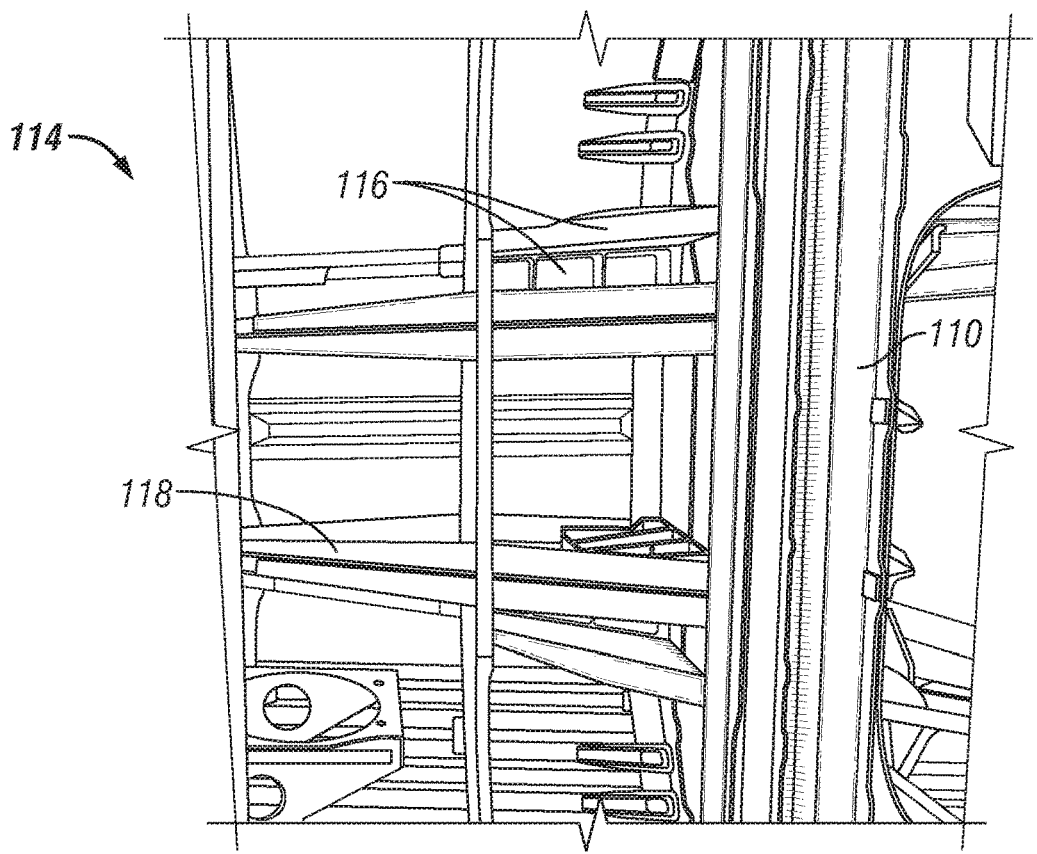
FIG. 2 is a partial side view of prior art architecture showing backup structures on the aft side of the pivot fittings and bulkhead.

FIG. 2 is a partial side view of prior art architecture showing backup structures 114 on the aft side of the pivot fittings (not visible in FIG. 2) and bulkhead 110. As shown, a number of longeron end fittings 116 are typically required to secure the ends of longerons 120 (not visible in FIG. 2) and a number of dual intercostal back up fittings 118, which may be CFRP parts with nested metallic fittings, may also be used in typical architectures.

Figure 3:
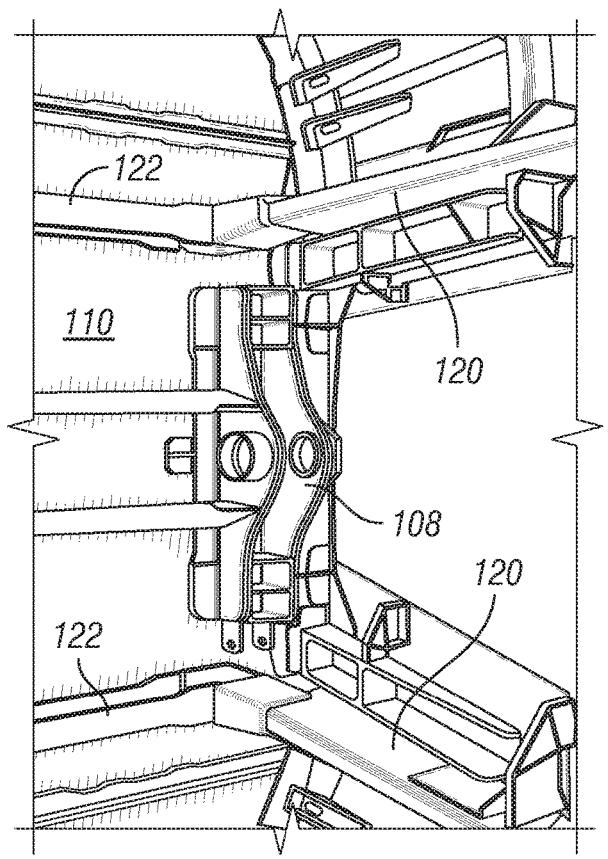
FIG. 3 is a perspective view of the forward side of the bulkhead and related architecture of FIG. 2.

FIG. 3 is a perspective view of the forward side of the bulkhead 110 and related architecture of FIG. 2. FIG. 3 shows the typical forward side arrangement of longerons 120, pivot fittings 108, and intercostals 120. As one of ordinary skill in the art having the benefit of this disclosure would understand, other configurations, components, and architectures are also possible.

A number of challenges, inefficiencies, and drawbacks exist with typical architectures, such as those shown in FIGS. 1-3. For example, there is often limited space available between longeron fitting ribs, a relatively large force may be required to torque the accompanying tension bolts (which may be a relatively large (e.g., ⅞" diameter or larger) tension bolt), awkward and heavy tooling is often used to torque the tension bolts, and there are tight space constraints between longeron fittings and pivot back up fittings. Other challenges, inefficiencies, and drawbacks also may exist.

Figure 4:
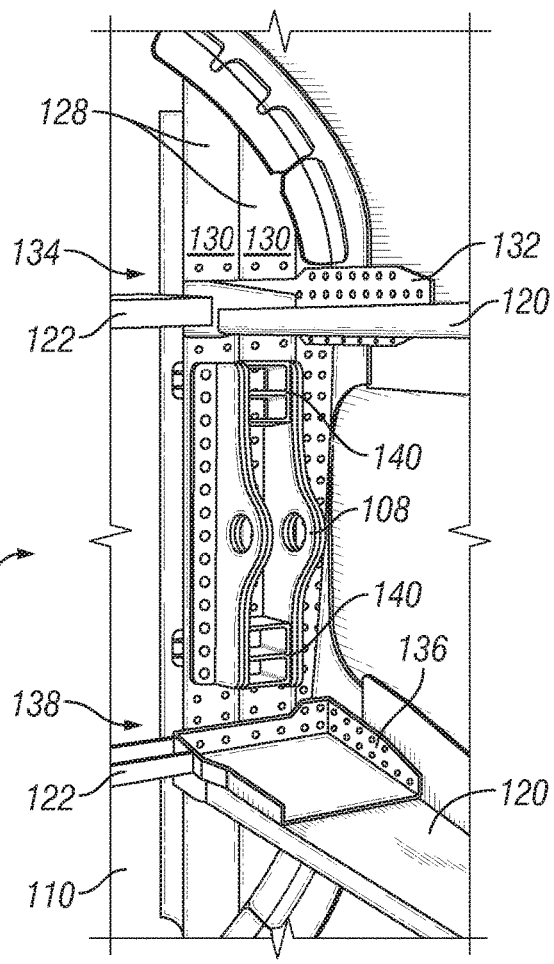
FIG. 4 is a perspective view of a portion of a forward side of a horizontal stabilizer architecture in accordance with disclosed embodiments.

FIG. 4 is a perspective view of a portion of a forward side 124 of a pivot bulkhead and support structure 126 in accordance with disclosed embodiments. In FIG. 4, bulkhead 110 is shown in partial transparency in order to view the components behind bulkhead 110. As shown, one or more back up beams 128 are mounted on the aft side of bulkhead 110. In FIG. 4 two CFRP back up beams 128 are shown, but other configurations can also be used. For example, a single back up beam 128 may be used, materials other than CFRP may be used to construct the back up beams 128, multi-piece beams may be used, and the like. In some embodiments, a single metallic I-beam may be used as a back up beam 128.

Back up beam 128 has a front side 130 that is mounted to the aft side of bulkhead 110. An upper longeron fitting 132 is mounted at an upper section 134 of back up beam(s) 128. Similarly, a lower longeron fitting 136 is mounted at a lower section 138 of back up beam(s) 128. As also illustrated, embodiments of the pivot bulkhead and support structure 126 include a pivot fitting 108 mounted in between the upper longeron fitting 132 and the lower longeron fitting 136. One or more fittings 140 (e.g., Gusset fittings or the like) may be used to secure pivot fitting 108 on the forward side of bulkhead 110 (in FIG. 4, two back up fittings 140 are shown). Other configurations are also possible.

Figure 5:
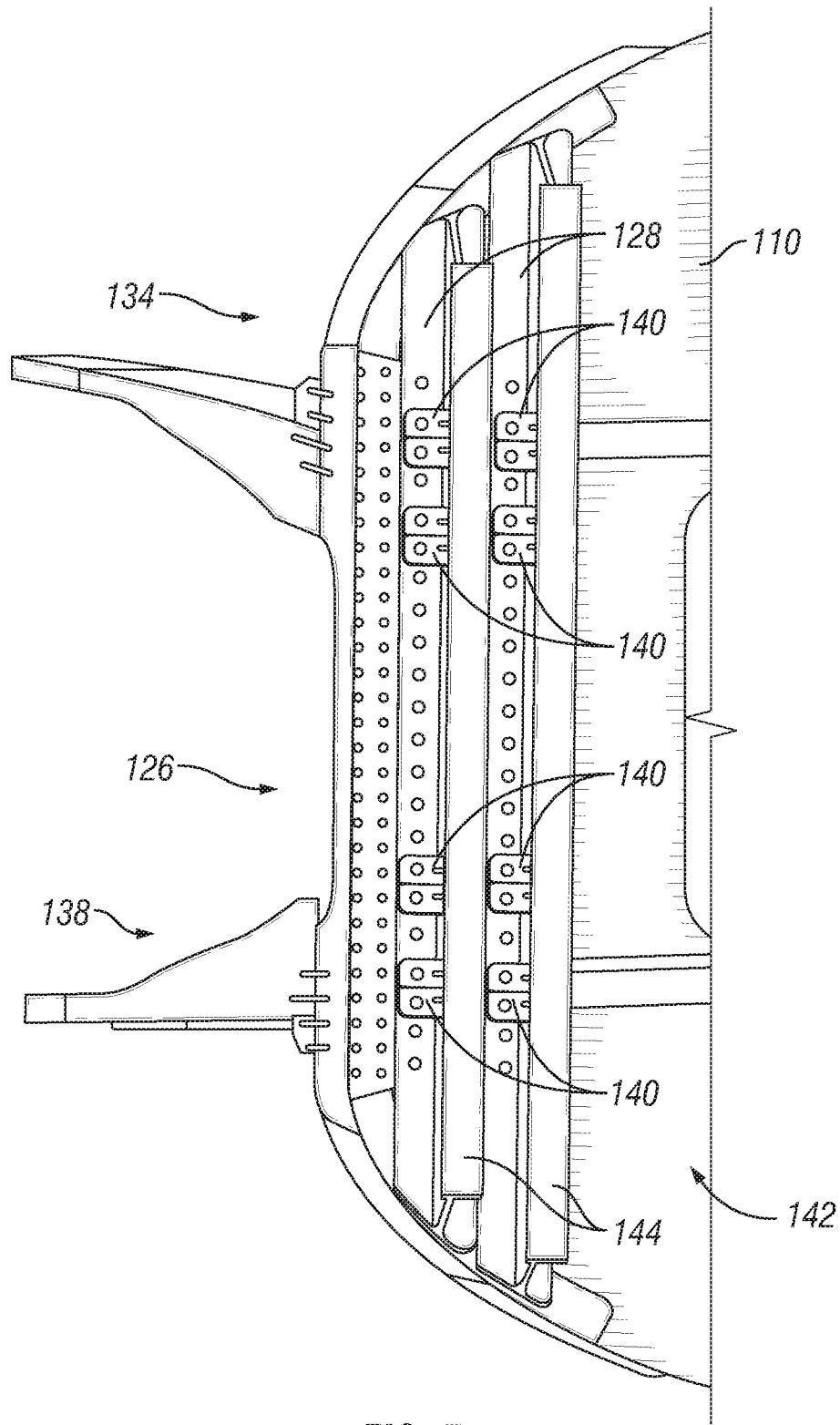
FIG. 5 is a perspective view of a portion of an aft side of a horizontal stabilizer architecture in accordance with disclosed embodiments.

FIG. 5 is a perspective view of a portion of an aft side 142 of a pivot bulkhead and support structure 126 in accordance with disclosed embodiments. As shown, one or more back up beams 128 have a back side 144 opposite the front side 130 that is mounted to bulkhead 110. As also shown, a number of back up fittings 140 are mounted to the back side 144 of back up beam(s) 128. Back up fittings 140 accept fasteners from the forward side 124 (or vice versa) and are used to secure the various longeron fittings (e.g., 132, 136) and pivot fittings 108 in place. In some embodiments, back up fittings 140 may be made of Titanium, Titanium-alloys, or the like. Depending upon, among other things, the type of aircraft, the type of horizontal stabilizer, the type of back up beam, particular load requirements, or the like, different amounts and types of back up fittings 140 may be used.

Figure 6A:
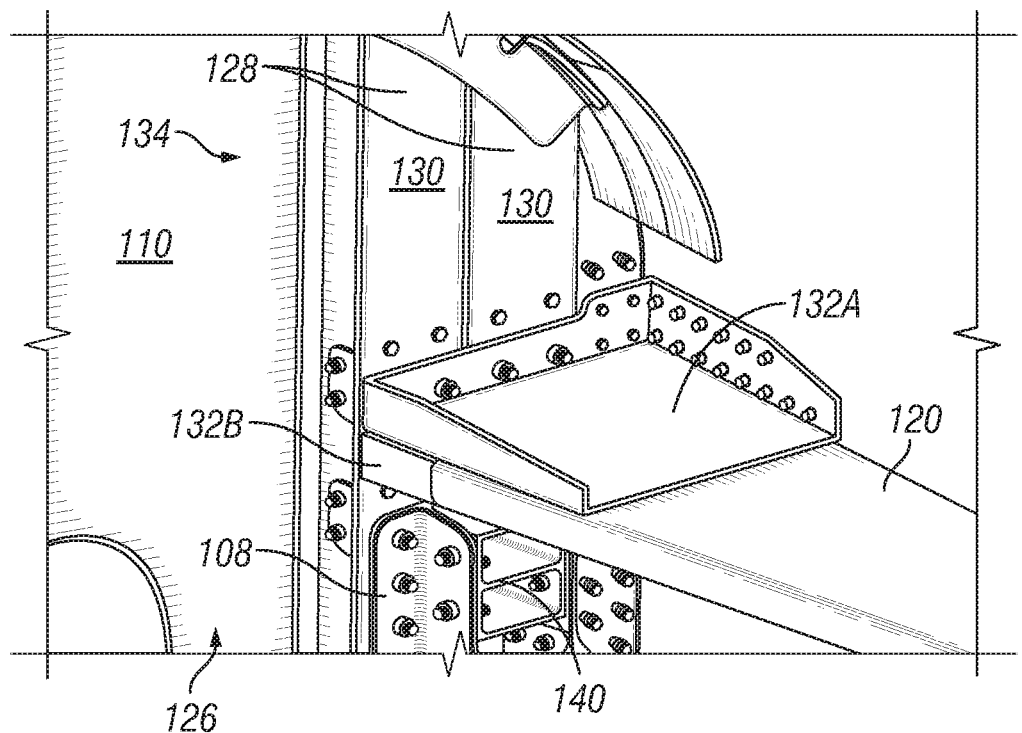
FIGS. 6A-C are close-up views of components of a horizontal stabilizer architecture in accordance with disclosed embodiments.
Figure 6B:
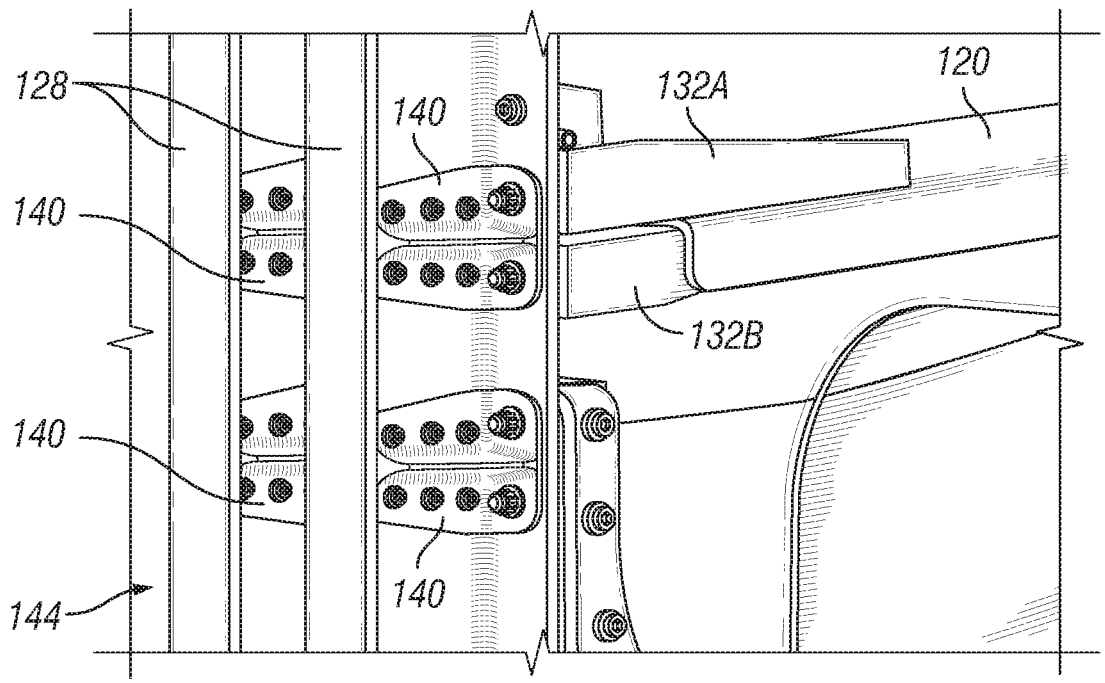
Figure 6C:
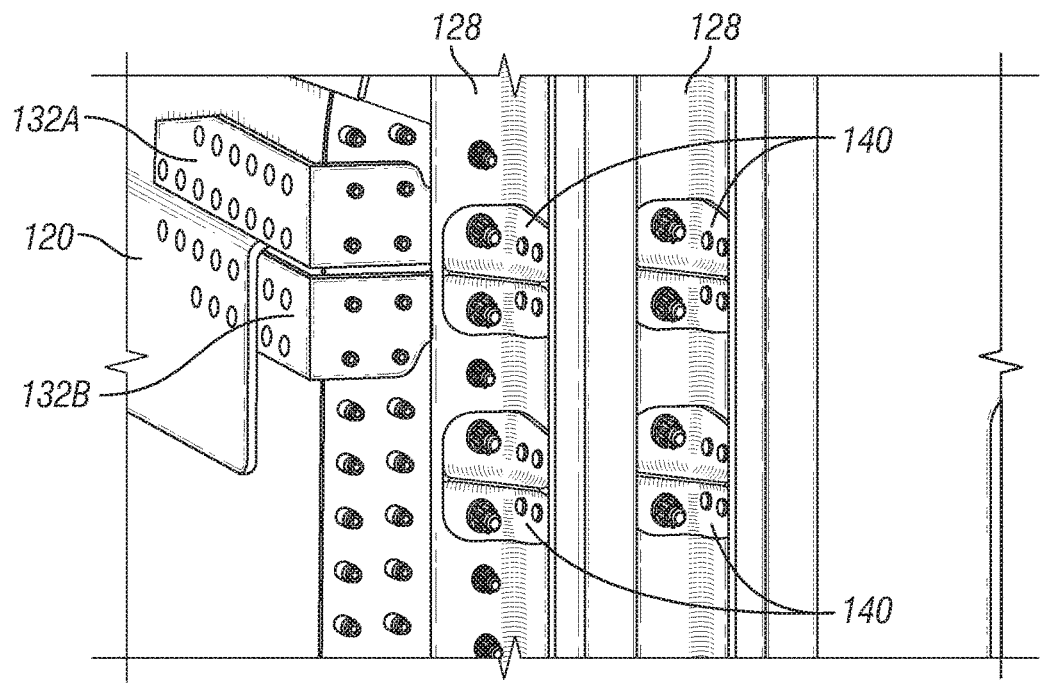

FIGS. 6A-C are close-up views of components of a pivot bulkhead and support structure 126 in accordance with disclosed embodiments. FIG. 6A shows a close up of an upper section 134 of back up beam(s) 128 having a front side 130 mounted to the aft side of bulkhead 110 (shown in partial transparency in FIG. 6A). As shown in the detail view of FIG. 6A, for some embodiments two upper longeron fittings 132A and 132B may be used to secure longeron 120 and a similar arrangement (not shown) may be used on the lower longeron 120. Use of multiple longeron fittings (e.g., 132, 136), among other things, adds a fail-safety to the pivot bulkhead and support structure 126. FIG. 6B is a close up detail view of the aft side of bulkhead 110 viewing outboard and FIG. 6C is a close up detail view of the aft side of bulkhead 110 viewing inboard.

Figure 7:
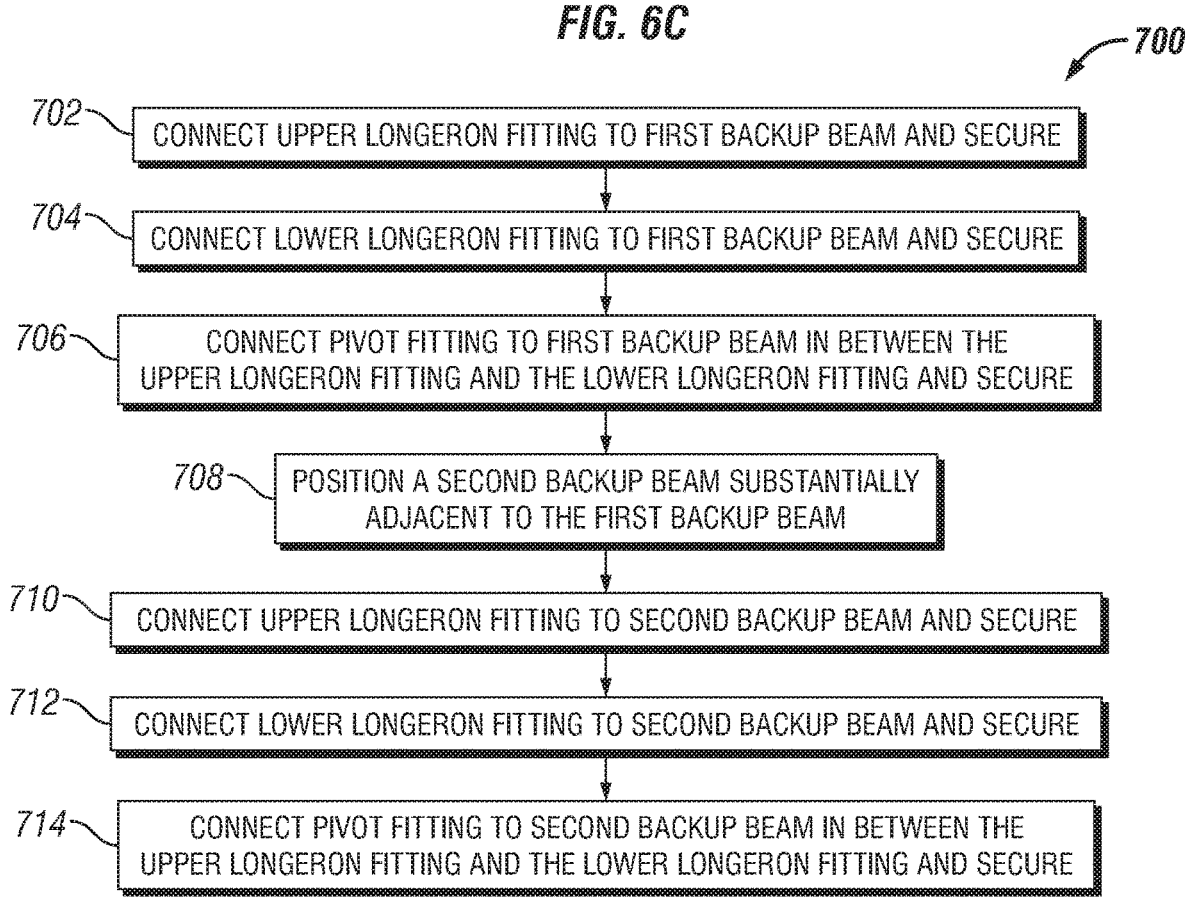
FIG. 7 is an exemplary flow diagram illustrating methods for assembling a vehicle structural architecture in accordance with disclosed embodiments.

FIG. 7 is an exemplary flow diagram illustrating methods 700 for assembling a vehicle structural architecture in accordance with disclosed embodiments. An exemplary method for assembling a vehicle pivot bulkhead and support structural architecture 126 includes at 702 connecting an upper longeron fitting 132 to a front side 130 of an upper section 134 of a first back up beam 128 and securing the upper longeron fitting 132 with a first back up fitting 140 on a back side 144 of the upper section 134 of the first back up beam. The method includes at 704 connecting a lower longeron fitting 136 to the front side 130 of a lower section 138 of the first back up beam 128 and securing the lower longeron fitting 136 with a second back up fitting 140 on the back side of the lower section 138 of the first back up beam 128. The method includes at 706 connecting a pivot fitting 108 to the front side 130 of the first back up beam 128 in between the upper longeron fitting 132 and the lower longeron fitting 136 and securing the pivot fitting 108 with a third back up fitting 140 on the back side 144 of the first back up beam 128.

As will be apparent to those of ordinary skill in the art having the benefit of this disclosure, method 700 steps need not be performed in the above-described linear fashion. For example, lower longeron fitting 136 or pivot fitting 108 may be connected first, or all the fittings may be positioned and then fitting 140 may be put on and secured, or other manufacturing sequences may be used. Similarly, it should be understood that other components, such as bulkhead 110, may intervene in, or be part of, the connection process of the various fittings to the back up beams as disclosed above.

In some embodiments, the method 700 for assembling a vehicle structural architecture 126 may also include at 708 positioning a second back up beam 128 substantially adjacent to the first back up beam 128 and at 710 connecting the upper longeron fitting 132 to the front side 130 of the upper section 134 of the second back up beam 128 and securing the upper longeron fitting 132 with a fourth back up fitting 140 on the back side 144 of the upper section 134 of the second back up beam 128. The method 700 may also include connecting the lower longeron fitting 136 to the front side 130 of the lower section 138 of the second back up beam 128 and securing the lower longeron fitting 136 with a fifth back up fitting 140 on the back side 144 of the lower section 138 of the second back up beam 128 and connecting the pivot fitting 108 to the front side 130 of the second back up beam 128 in between the upper longeron fitting 132 and the lower longeron fitting 136 and securing the pivot fitting 108 with a sixth back up fitting 140 on the back side 144 of the second back up beam 128. Again, as will be apparent to those of ordinary skill in the art having the benefit of this disclosure, other sequences or order of assembly may be used and other components may be included in the connection of parts.

Although various embodiments have been shown and described, the present disclosure is not so limited and will be understood to include all such modifications and variations would be apparent to one skilled in the art.

What is claimed is:

1. A vehicle structural architecture comprising:
    a first back up beam comprising a front side, a back side, an upper section, and a lower section;
    an upper longeron fitting connected to the front side of the upper section of the first back up beam and secured with a first back up fitting on the back side of the upper section of the first back up beam;
    a lower longeron fitting connected to the front side of the lower section of the first back up beam and secured with a second back up fitting on the back side of the lower section of the first back up beam; and
    a pivot fitting connected to the front side of the first back up beam in between the upper longeron fitting and the lower longeron fitting and secured with a third back up fitting on the back side of the first back up beam.

2. The vehicle structural architecture of claim 1 comprising:
    a second back up beam comprising a front side, a back side, an upper section, and a lower section and positioned substantially adjacent to the first back up beam;
    the upper longeron fitting connected to the front side of the upper section of the second back up beam and secured with a fourth back up fitting on the back side of the upper section of the second back up beam;
    the lower longeron fitting connected to the front side of the lower section of the second back up beam and secured with a fifth back up fitting on the back side of the lower section of the second back up beam; and
    the pivot fitting connected to the front side of the second back up beam in between the upper longeron fitting and the lower longeron fitting and secured with a sixth back up fitting on the back side of the second back up beam.

3. The vehicle structural architecture of claim 2 wherein the pivot fitting comprises an upper end and a lower end and wherein the third back up fitting and the sixth back up fitting secure the upper end of the pivot fitting.

4. The vehicle structural architecture of claim 3 comprising:
   a seventh back up fitting on the back side of the lower section of the first back up beam that secures the lower end of the pivot fitting; and
   an eighth back up fitting on the back side of the lower section of the second back up beam that secures the lower end of the pivot fitting.

5. The vehicle structural architecture of claim 1 wherein the first back up beam comprises a Carbon Fiber Reinforced Polymer (CFRP) beam.

6. The vehicle structural architecture of claim 2 wherein the second back up beam comprises a Carbon Fiber Reinforced Polymer (CFRP) beam.

7. The vehicle structural architecture of claim 1 wherein the first back up fitting, the second back up fitting, and the third back up fitting comprise titanium fittings.

8. The vehicle structural architecture of claim 1 wherein the vehicle comprises an aircraft.

9. A method for assembling a vehicle structural architecture, the method comprising:
   connecting an upper longeron fitting to a front side of an upper section of a first back up beam and securing the upper longeron fitting with a first back up fitting on a back side of the upper section of the first back up beam;
   connecting a lower longeron fitting to the front side of a lower section of the first back up beam and securing the lower longeron fitting with a second back up fitting on the back side of the lower section of the first back up beam; and
   connecting a pivot fitting to the front side of the first back up beam in between the upper longeron fitting and the lower longeron fitting and securing the pivot fitting with a third back up fitting on the back side of the first back up beam.

10. The method for assembling a vehicle structural architecture of claim 9 comprising:
    positioning a second back up beam comprising a front side, a back side, an upper section, and a lower section substantially adjacent to the first back up beam;
    connecting the upper longeron fitting to the front side of the upper section of the second back up beam and securing the upper longeron fitting with a fourth back up fitting on the back side of the upper section of the second back up beam;
    connecting the lower longeron fitting to the front side of the lower section of the second back up beam and securing the lower longeron fitting with a fifth back up fitting on the back side of the lower section of the second back up beam; and
    connecting the pivot fitting to the front side of the second back up beam in between the upper longeron fitting and the lower longeron fitting and securing the pivot fitting with a sixth back up fitting on the back side of the second back up beam.

11. The method for assembling a vehicle structural architecture of claim 10 wherein the pivot fitting comprises an upper end and a lower end and the method comprises securing the upper end of the pivot fitting with the third back up fitting and the sixth back up fitting.

12. The method for assembling a vehicle structural architecture of claim 11 comprising:
    securing the lower end of the pivot fitting with a seventh back up fitting on the back side of the lower section of the first back up beam; and
    securing the lower end of the pivot fitting with an eighth back up fitting on the back side of the lower section of the second back up beam.

13. The method for assembling a vehicle structural architecture of claim 9 wherein the first back up beam comprises a Carbon Fiber Reinforced Polymer (CFRP) beam.

14. The method for assembling a vehicle structural architecture of claim 10 wherein the second back up beam comprises a Carbon Fiber Reinforced Polymer (CFRP) beam.

15. The method for assembling a vehicle structural architecture of claim 9 wherein the first back up fitting, the second back up fitting, and the third back up fitting comprise titanium fittings.

16. The method for assembling a vehicle structural architecture of claim 9 wherein the vehicle comprises an aircraft.

17. An aircraft comprising:
    a horizontal stabilizer;
    a fuselage tail section located aft of the horizontal stabilizer;
    a fuselage section located forward of the horizontal stabilizer;
    a bulkhead inside the fuselage tail section, the bulkhead having an aft facing side and a forward facing side;
    a first back up beam comprising an upper section and a lower section, the first back up beam being mounted on the aft facing side of the bulkhead;
    a second back up beam comprising an upper section and a lower section, the second back up beam being mounted on the aft facing side of the bulkhead and spaced apart from the first back up beam;
    a first upper longeron fitting connected to the forward facing side of the bulkhead and secured to the upper section of the first back up beam with a first back up fitting on the upper section of the first back up beam;
    a first lower longeron fitting connected to the forward facing side of the bulkhead and secured to the lower section of the first back up beam with a second back up fitting on the lower section of the first back up beam; and
    a first horizontal stabilizer pivot fitting connected to the forward facing side of the bulkhead in between the first upper longeron fitting and the first lower longeron fitting and secured to the first back up beam with a third back up fitting (140) on the aft facing side of the bulkhead;
    a second upper longeron fitting connected to the forward facing side of the bulkhead and secured to the upper section of the second back up beam with a fourth back up fitting on the upper section of the second back up beam;
    a second lower longeron fitting connected to the forward facing side of the bulkhead and secured to the lower section of the second back up beam with a fifth back up fitting on the lower section of the second back up beam; and
    a second horizontal stabilizer pivot fitting connected to the forward facing side of the bulkhead in between the second upper longeron fitting and the second lower longeron fitting and secured to the second back up beam with a sixth back up fitting on the aft facing side of the bulkhead.

18. The aircraft of claim 17 wherein the first back up beam and the second back up beam comprise a Carbon Fiber Reinforced Polymer (CFRP) beams.

19. The aircraft of claim 18 wherein the first back up beam and the second back up beam each comprise an assembly of four separate CFRP beams.

20. The aircraft of claim 17 wherein at least one of the first back up fitting, the second back up fitting, the third back up fitting, the fourth back up fitting, the fifth back up fitting, or the sixth back up fitting comprise a titanium fitting.

* * * * *